US007672687B2

(12) United States Patent
Kuo et al.

(10) Patent No.: US 7,672,687 B2
(45) Date of Patent: Mar. 2, 2010

(54) WIRELESS SIGNAL TRANSCEIVER UNIT WITH TURNING MECHANISM FOR ADJUSTING ANTENNA DIRECTION THEREOF

(75) Inventors: Yien-Chung Kuo, Taichung (TW); Cheng-Chen Lee, Kaohsiung (TW); Sheng-Yuan Wang, Kaohsiung (TW)

(73) Assignee: Getac Technology Corporation, Hsinchu (TW)

( * ) Notice: Subject to any disclaimer, the term of this patent is extended or adjusted under 35 U.S.C. 154(b) by 846 days.

(21) Appl. No.: 11/337,538

(22) Filed: Jan. 24, 2006

(65) Prior Publication Data

US 2007/0135157 A1 Jun. 14, 2007

(30) Foreign Application Priority Data

Dec. 9, 2005 (TW) .............................. 94143712 A

(51) Int. Cl.
*H04M 1/00* (2006.01)

(52) U.S. Cl. ................ 455/550.1; 455/63.1; 455/575.7; 455/562.1; 455/66.1; 455/90.3; 343/840; 343/702; 343/795; 343/872

(58) Field of Classification Search ................ 455/63.1, 455/575.7, 562.1, 66.1, 90.3, 550.1; 343/840, 343/702, 872, 795
See application file for complete search history.

(56) References Cited

U.S. PATENT DOCUMENTS

| | | | | |
|---|---|---|---|---|
| 1,666,480 | A | 4/1928 | Zillger | |
| 4,461,033 | A * | 7/1984 | Todo | 455/78 |
| 4,543,584 | A * | 9/1985 | Leer | 343/881 |
| 5,444,737 | A * | 8/1995 | Cripps et al. | 375/219 |
| 5,555,459 | A * | 9/1996 | Kraus et al. | 343/702 |
| 5,841,402 | A * | 11/1998 | Dias et al. | 343/702 |
| 5,884,197 | A * | 3/1999 | Ricardo et al. | 455/575.7 |
| 5,903,237 | A | 5/1999 | Crosby et al. | |
| 5,949,379 | A | 9/1999 | Yang | |
| 5,969,689 | A * | 10/1999 | Martek et al. | 343/758 |
| 6,087,933 | A * | 7/2000 | Addy et al. | 340/539.24 |
| 6,108,526 | A * | 8/2000 | van der Plas | 455/78 |
| 6,140,970 | A * | 10/2000 | Ylijurva | 343/702 |
| 6,236,674 | B1 * | 5/2001 | Morelli et al. | 375/219 |
| 6,259,410 | B1 * | 7/2001 | Chang | 343/702 |
| 6,795,033 | B2 * | 9/2004 | Matz et al. | 343/760 |
| 6,813,481 | B1 * | 11/2004 | Ide | 455/129 |
| 6,816,121 | B1 * | 11/2004 | Cheng et al. | 343/702 |
| 6,853,353 | B2 * | 2/2005 | Wang et al. | 343/901 |
| 7,019,703 | B2 * | 3/2006 | Webb et al. | 343/761 |
| 7,245,266 | B1 * | 7/2007 | Szente et al. | 343/834 |
| 7,250,845 | B2 * | 7/2007 | Young et al. | 340/5.92 |
| 2004/0227684 | A1 | 11/2004 | Deng | |

FOREIGN PATENT DOCUMENTS

| | | |
|---|---|---|
| DE | 20120650 | 4/2002 |
| WO | WO2004/079861 | 9/2004 |

* cited by examiner

*Primary Examiner*—Marceau Milord
(74) *Attorney, Agent, or Firm*—Quintero Law Office

(57) ABSTRACT

A wireless signal transceiver unit with turning mechanism for adjusting antenna direction includes a base, a rotatable antenna assembly, and a pivot mechanism provided between the antenna assembly and the base for rotatably supporting and connecting the antenna assembly to the base. The antenna assembly includes a plate-shaped body upright located on a circular disk, and is manually turned about the pivot mechanism relative to the base toward a selected direction for best receiving a wireless signal.

8 Claims, 6 Drawing Sheets

WIRELESS SIGNAL TRANSCEIVER UNIT WITH TURNING MECHANISM FOR ADJUSTING ANTENNA DIRECTION THEREOF

FIELD OF THE INVENTION

The present invention relates to a wireless signal transceiver unit, and more particularly, to a wireless signal transceiver unit with turning mechanism for adjusting antenna direction.

BACKGROUND OF THE INVENTION

Due to the currently highly developed wireless signal transmission technique that provides the advantages of no wiring, wide operating areas, good security system, etc., most modern offices or commercial environments would utilize the wireless signal network to receive and transmit signals.

In the architecture for the currently available wireless signal network, a wireless signal transceiver and a wireless network card are generally included. The former is an intermedium functioning like a hub of a cabled local area network to correctly transmit signals to a destination, and accept signals sent from the destination. The latter is mounted on a client apparatus, such as a computer and personal digital assistant (PDA), to link the client apparatus to the wireless signal transceiver for transferring data. With the maturity of the wireless network technique and the popularization of the wireless network environments, there are more and more different types of wireless signal transceiver products introduced into markets.

For the wireless signal transceiver to function, an antenna must be provided thereon. Most of the conventional wireless signal transceivers have a pole antenna, which is workable to receive and transmit wireless signals in most cases. However, the conventional wireless signal transceivers frequently have the problem of poor signal receiving when relatively high antenna directionality is required to receive the wireless signal.

It is known that Wimax is an abbreviation of Worldwide Interoperability for Microwave Access, a certification mark for products that pass conformity and interoperability tests for the IEEE 802.16 standards. Taking the Wimax antenna module as an example, it is currently widely used in many office environments. However, it is largely dependent on the antenna directionality. This type of antenna module is easily interfered by various factors, such as antenna radiation pattern, environmental changes such as barriers, refraction of radio frequency (RF), and reflection of RF, etc., to hinder the signal transceiver from performing normally. To adjust the antenna direction, a user has to inconveniently turn or move the whole wireless signal transceiver to different places.

Moreover, the conventional wireless signal transceivers have not any device provided thereon for telling a user the intensity of a wireless signal being received. Thus, in most cases, the user is not able to determine which direction is best for the antenna to receive a wireless signal.

SUMMARY OF THE INVENTION

A primary object of the present invention is to provide a wireless signal transceiver unit with turning mechanism for adjusting antenna direction to enable a user to adjust the antenna direction of the signal transceiver unit depending on the actual site in which the antenna operates.

Another object of the present invention is to provide a turning mechanism for adjusting antenna direction, which is rotatably associated with a wireless signal transceiver unit. When it is desired to adjust an antenna of the signal transceiver unit toward a direction best for receiving a wireless signal, simply turns a plate-shaped body of the antenna relative to a base of the signal transceiver unit without the need of moving the whole signal transceiver unit.

A further object of the present invention is to provide a wireless signal transceiver unit with signal intensity indicating unit, so that a user may turn a rotatable antenna assembly of the signal transceiver unit while observing the on/off of lights included in the signal intensity indicating unit to quickly and accurately find the direction best for receiving a wireless signal.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
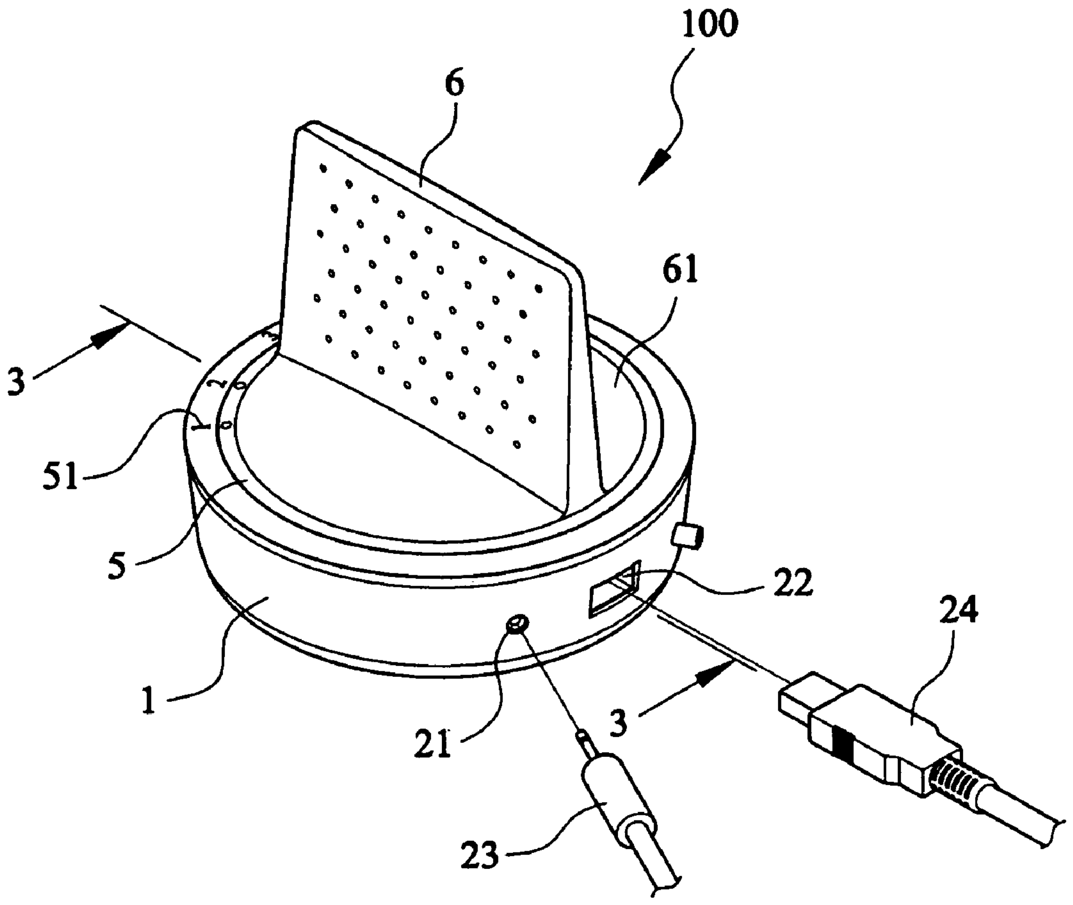
FIG. 1 is an assembled perspective view of a wireless signal transceiver unit with turning mechanism for adjusting antenna direction according to a preferred embodiment of the present invention.
Figure 2:
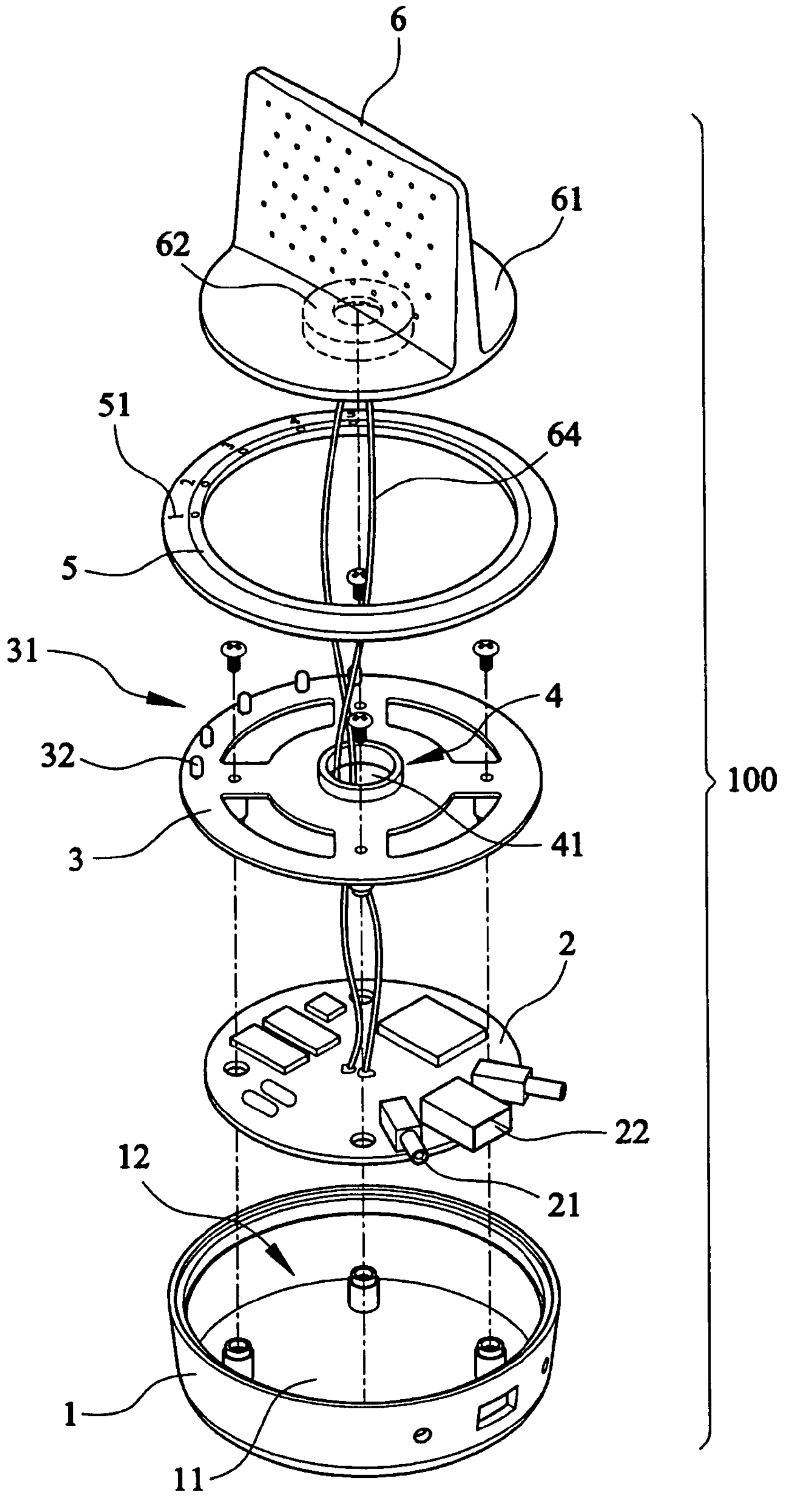
FIG. 2 is an exploded perspective view of FIG. 1.
Figure 3:
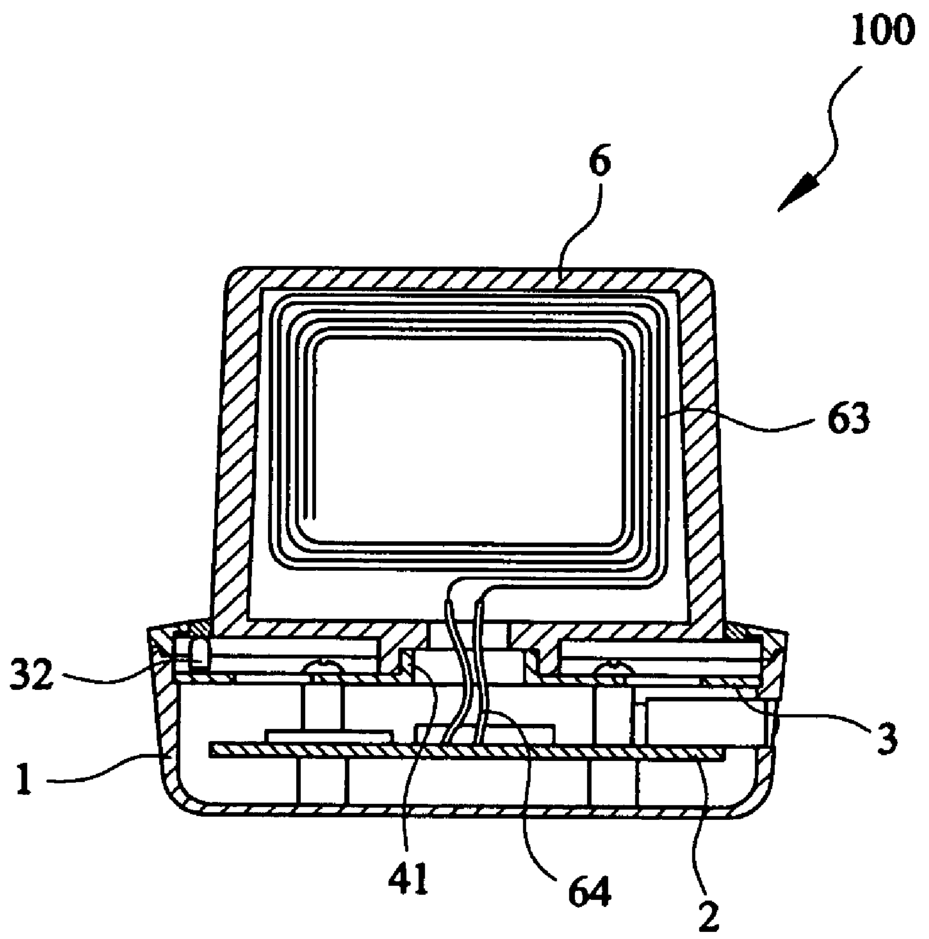
FIG. 3 is sectional view taken along line 3-3 of FIG. 1.

Please refer to FIGS. 1 and 2 that are assembled and exploded perspective views, respectively, of a wireless signal transceiver unit with turning mechanism for adjusting antenna direction according to a preferred embodiment of the present invention, and to FIG. 3 that is a sectional view taken along line 3-3 of FIG. 1. As shown, the wireless signal transceiver unit, which is generally denoted a numeral reference 100, includes a base 1 defining an internal space 11 and an upper open area 12; a circuit board 2 mounted in the internal space 11 of the base 1 for various necessary electronic components and connectors to mount thereon; a support plate 3 mounted in the upper open area 12 of the base 1; a pivot mechanism 4 provided on the support plate 3 and including a central through hole 41; an annular decorative cover 5 for covering an upper peripheral area of the support plate 3; and a rotatable antenna assembly 6 rotatably connected to the pivot mechanism 4 to locate on and upward protrude from the support plate 3.

The connectors provided on the circuit board 2 include at least a plug jack 21 for receiving a plug pin 23 on a power cord, so that power could be supplied from an external power source to the circuit board 2; and a female connector 22, such as a USB connector, for receiving a male connector 24 on a signal cable for transmitting signals.

The support plate 3 is provided at a predetermined position with a wireless signal intensity indicating unit 31, which includes a plurality of light-emitting elements 32 showing different brightness or colors to indicate the intensity or strength of the received wireless signal.

In the preferred embodiment of the present invention, the light-emitting elements 32 are spaced along the upper peripheral area of the support plate 3 and covered by the annular decorative cover 5, such that light emitted from any one of the light-emitting elements 32 can penetrate through the annular decorative cover 5 and project outward, allowing a user to observe the wireless signal intensity indicating unit 31 from an outer side of the annular decorative cover 5 and know the intensity of the wireless signal received via the antenna assembly 6. The annular decorative cover 5 may be further provided at an outer surface with legible marks 51, such as numbers, corresponding to the light-emitting elements 32 to serve as a visual aid to check the intensity of received wireless signal.

In the preferred embodiment of the present invention, the antenna assembly 6 is a WiMax antenna module having a plate-shaped body upright seated on a circular disk 61. The circular disk 61 is provided at a bottom side with a pivot cup 62 for fitly engaging with and rotatably seating on the pivot mechanism 4. Whereby, the antenna assembly 6 may be manually rotated about the pivot mechanism 4 toward a desired direction.

The pivot mechanism 4 is mainly used as a supporting member to carry and support the antenna assembly 6 while allowing the antenna assembly 6 to rotate about the pivot mechanism 4. It is understood any other structure that is functionally equivalent to the pivot mechanism 4 can be used in the present invention to replace the pivot mechanism 4.

It would be obvious to a person of ordinary skill in the art that the antenna assembly 6 may be rotatable relative to the base 1 through correspondingly molded pivot shafts, or other equivalent pivotal bearing structures other than the illustrated pivot mechanism 4.

As can be seen from FIG. 3, the antenna assembly 6 is internally provided with an antenna coil 63 for receiving radio waves of a given frequency. The antenna coil 63 is connected to predetermined contacts on the circuit board 2 via a pair of signal transmission cables 64, which are extended through the through hole 41 of the pivot mechanism 4. In practical applications of the present invention, the rotatable antenna assembly 6 may be differently formed into any desired or suitable structure and/or configuration, or be differently decorated.

Figure 4:
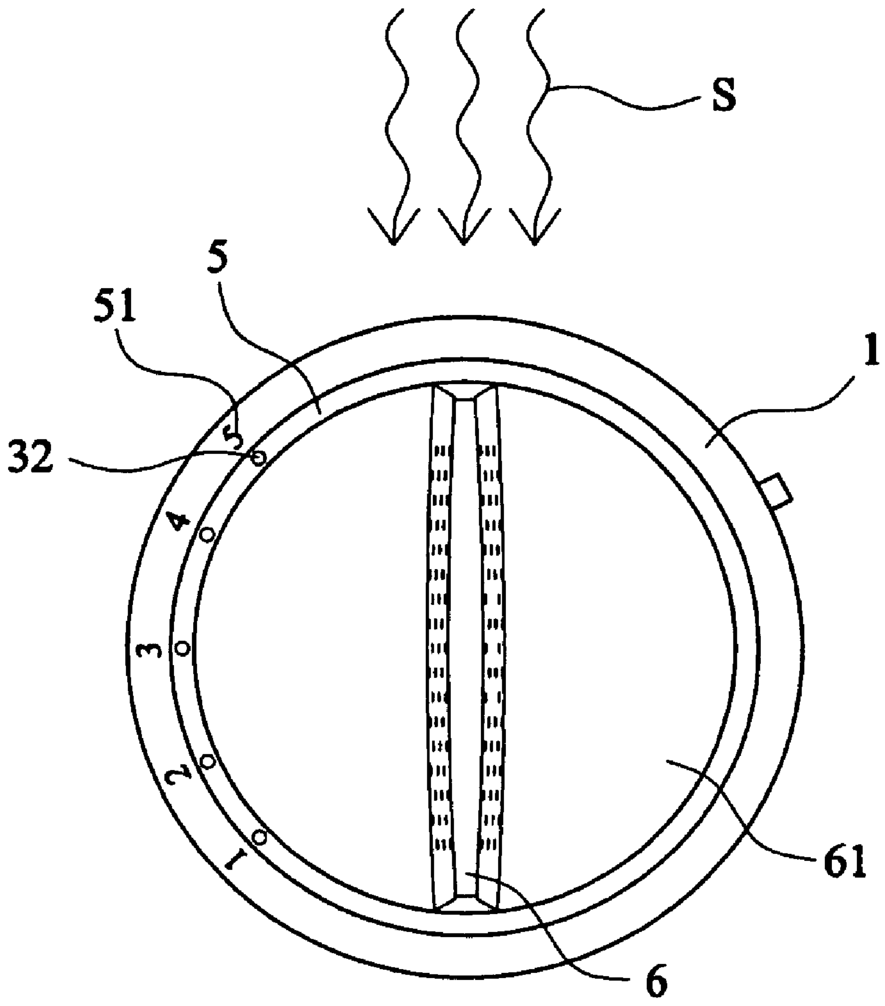
FIG. 4 shows an antenna of the wireless signal transceiver unit of the present invention before being directed toward a wireless signal source.
Figure 5:
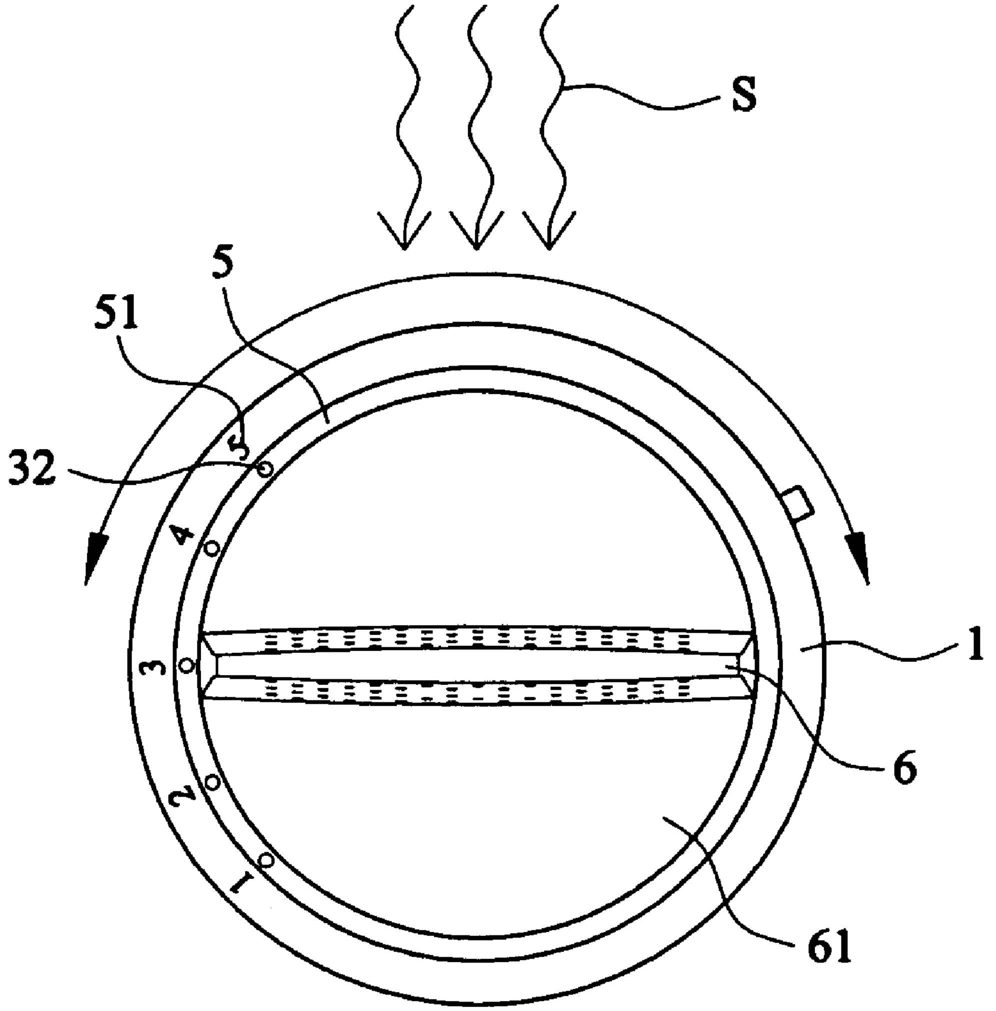
FIG. 5 shows the antenna of the wireless signal transceiver unit of the present invention after being turned to direct toward a wireless signal source.

When the wireless signal transceiver unit 100 of the present invention is used without rotating the antenna assembly 6 toward a direction of a wireless signal source S, as shown in FIG. 4, it would not be able to provide good wireless signal receiving effect. At this point, a user may easily manually rotate the antenna assembly 6 until the antenna assembly 6 is directed toward a direction in which the best signal receiving effect can be achieved, as shown in FIG. 5. The user may observe the lighting status of the light-emitting elements 32 while rotating the antenna assembly 6, so as to know the intensity of the received wireless signal and quickly accurately adjust the antenna assembly 6 to the direction best for receiving the wireless signal.

Figure 6:
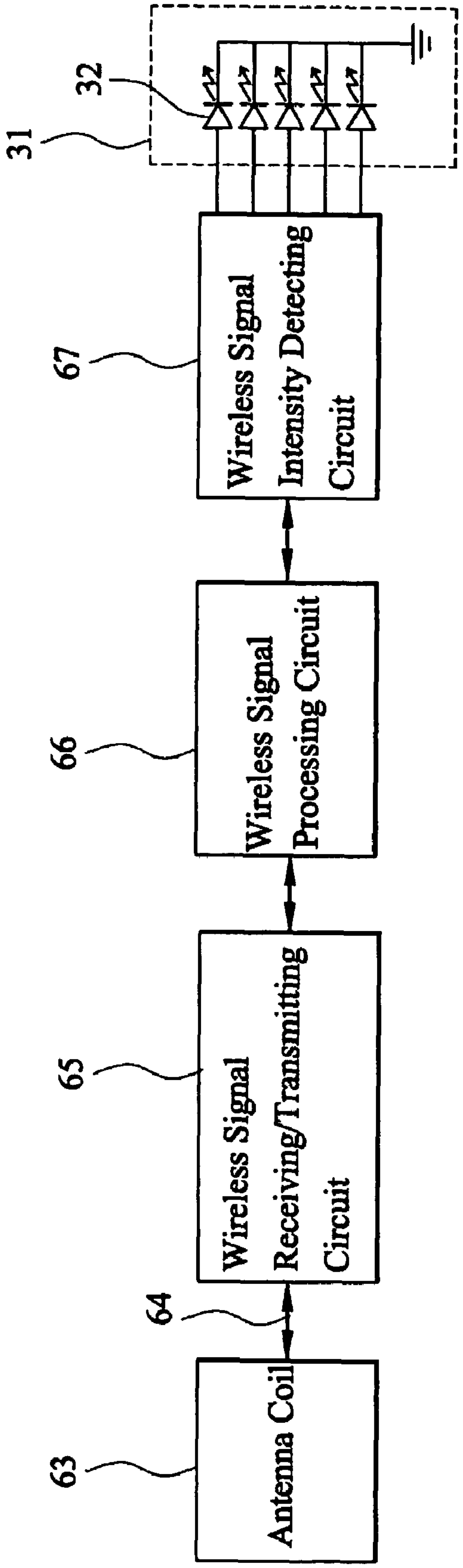
FIG. 6 is a block diagram showing the circuits of the wireless signal transceiver unit of the present invention.

FIG. 6 is a block diagram showing the circuits of the wireless signal transceiver unit 100 of the present invention. As shown, a wireless signal is received via the antenna coil 63, and then sent to a wireless signal receiving/transmitting circuit 65 via the signal transmission cables 64. The received signal is further sent from the wireless signal receiving/transmitting circuit 65 to a wireless signal processing circuit 66, which is connected to a wireless signal intensity detecting circuit 67 for detecting the intensity of the received wireless signal. The detected signal intensity is indicated by the on/off status of the light-emitting elements 32 of the wireless signal intensity indicating unit 31.

Unlike the wireless signal transceiver of prior art, the present invention is equipped with a turning mechanism for adjusting antenna direction, which allows a user to conveniently manually rotate the antenna assembly 6 of the wireless signal transceiver unit 100 toward a direction best for receiving a wireless signal. When the wireless signal is transmitted from a different direction, or when the wireless signal transceiver unit 100 is moved to a different place, the user may easily search for the correct direction of the wireless signal source simply by manually turning the plate-like body of the rotatable antenna assembly 6 toward a desired direction in which a relatively high signal intensity is shown.

The present invention is also characterized by the light-emitting elements 32 serving as the signal intensity indicators. The user may turn the antenna assembly 6 while observing the on/off of the light-emitting elements 32 to tell the signal intensity at different antenna directions, and thereby quickly and accurately find the direction best for receiving the wireless signal.

What is claimed is:

1. A wireless signal transceiver unit, comprising: a base having a support plate mounted therein; a rotatable antenna assembly provided with at least one antenna coil; a pivot mechanism being provided between the rotatable antenna assembly and the support plate to rotatably support the antenna assembly on the base, such that the antenna assembly is rotably operatable about the pivot mechanism toward a selected direction relative to the base; a wireless signal intensity indicating unit provided on the support plate for indicating an intensity of a wireless signal received via the antenna coil of the rotatable antenna assembly, wherein the wireless signal intensity unit comprises at least one light emitting element showing different brightness or colors according to the signal intensity of the received wireless signal to provide visual feedback of the signal intensity; and a decorative cover provided on the support plate, wherein the decorative cover is further provided with at least one legible mark thereon to visually indicate the intensity of the received wireless signal according to the light output by the at least one light-emitting element.

2. The wireless signal transceiver unit as claimed in claim 1, wherein the rotatable antenna assembly comprises a plate-like antenna body upright located on a circular disk.

3. The wireless signal transceiver unit as claimed in claim 1, wherein the at least one light-emitting element generates a light projecting toward the decorative cover.

4. The wireless signal transceiver unit as claimed in claim 1, wherein the rotatable antenna assembly is a Wimax antenna module.

5. A wireless signal transceiver unit, comprising: a base; a rotatable antenna assembly provided with at least one antenna coil and rotably supported by the base, such that the antenna assembly is rotably operatable toward a selected direction relative to the base; a wireless signal intensity indicating unit provided on the base for indicating an intensity of a wireless signal received via the antenna coil of the rotatable antenna assembly, wherein the wireless signal intensity unit comprises at least one light emitting element showing different brightness or colors according to the signal intensity of the received wireless signal to provide visual feedback of the signal intensity; and a decorative cover provided on the support plate, wherein the decorative cover is further provided with at least one legible mark thereon to visually indicate the intensity of the received wireless signal according to the light output by the at least one light-emitting element.

6. The wireless signal transceiver unit as claimed in claim 5, wherein the rotatable antenna assembly comprises a plate-like antenna body upright located on a circular disk.

7. The wireless signal transceiver unit as claimed in claim 5, wherein the at least one light-emitting element generates a light projecting toward the decorative cover.

8. The wireless signal transceiver unit as claimed in claim 5, wherein the rotatable antenna assembly is a Wimax antenna module.

* * * * *